Jan. 14, 1964  R. R. MATTHEWS  3,117,486
SELF-TAPPING FLUSH INSERT
Filed June 17, 1960
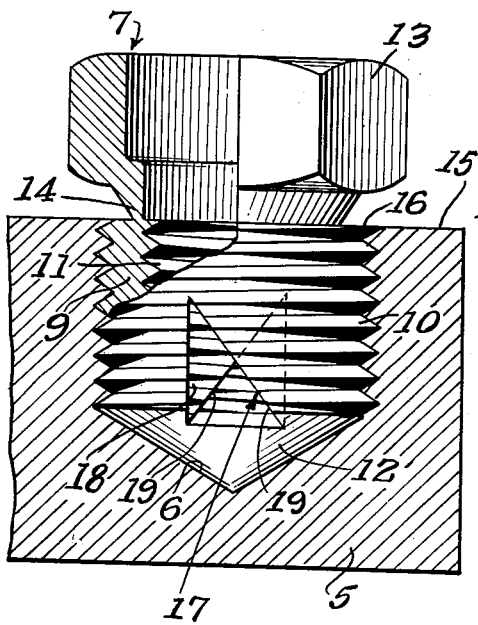
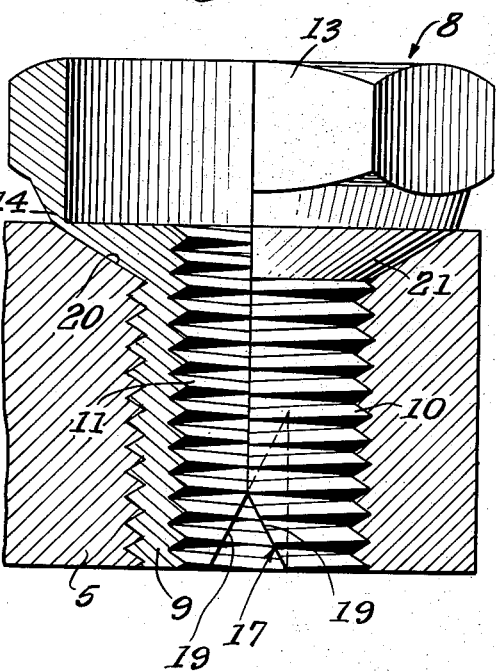
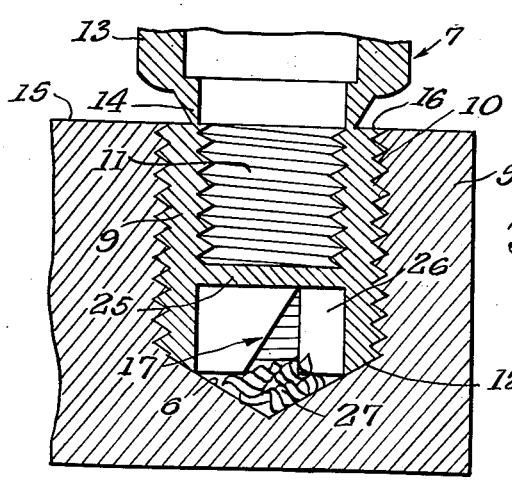
INVENTOR.
RICHARD R. MATTHEWS
BY E. G. Stratton
ATTORNEY United States Patent Office 3,117,486
Patented Jan. 14, 1964

3,117,486
SELF-TAPPING FLUSH INSERT
Richard R. Matthews, Pico Rivera, Calif.
(7950 Alameda St., Huntington Park, Calif.)
Filed June 17, 1960, Ser. No. 36,966
1 Claim. (Cl. 85—47)

This invention relates to inserts for providing relatively soft metal or plastic bodies with hard, long-wearing inserts. The primary use of such inserts is to firmly anchor studs, pins and like preferably threaded members to such soft bodies.

Generally, self-tapping inserts are well-known. However, inserts that combine self-tapping features and portions that shear off under torque greater than the torque applied to enter a self-tapping insert in a soft body, are not presently known and provide a combination device that has great utility and represents an improvement over the art of insert design and application. It is an object of the present invention to provide an insert of the character above indicated.

While the present invention is adapted for embodiment in the design of inserts varying greatly in size, the same has particular efficacy for inserts of small size, for example, one-quarter inch outer diameter and smaller.

Another object of the invention is to provide an insert of the character referred to that is of the flush type after insertion of a body and torsional removal of the head thereof, thereby enabling the use of larger and stronger insert-applying tools. Tool breakage is, therefore, greatly minimized.

A further object of the invention is to provide an insert, as above, that embodies chip-trapping features, particularly to keep chips that are cut during self-tapping rotation of the insert from clogging the internal bore of the insert.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a greatly enlarged elevational view of one form of insert according to the present invention, partly in longitudinal section and shown in operative position in a soft body just prior to torsional removal of the head thereof.

FIG. 2 is a similar view of another form of insert.

FIG. 3 is a cross-sectional view of another modification.

In the drawing, a relatively soft base body 5 is shown in the three views, the same being usually aluminum or other soft metal or plastic. In FIG. 1, said body is shown with a blind seat or hole that terminates in a conical bottom 6. In FIG. 2, said body 5 is shown with a through hole or bore. In both instances, said seat, hole or bore is either drilled or punched to have a smooth cylindrical wall and of a diameter according to the base or root diameter of the outer thread of the insert that is to be anchored in the body. FIG. 3 shows an insert with a chip-trapping portion the same being particularly applicable where the insert seat is blind, as in FIG. 1.

FIG. 1 shows an insert 7 designed to be fitted to a seat having a bottom, and FIG. 2 shows an insert 8 especially for a through bore or hole. Both inserts are formed, preferably by screw machine practice, of hard rod stock of steel or hard brass, as desired. Hexagonal stock is preferred since the same produces inserts having desired polygonal heads without the need for machining the tool-engaged faces of said heads.

The insert 7 integrally comprises a body 9 having external threads 10 of a root diameter approximating the described hole in the body 5, and internal threads 11 for receiving a threaded stem, stud or pin (not shown), a conical closed end 12 on said body and having a conical taper conforming to that of the bottom 6, a polygonal-sided head 13 on the other end of the body 9, and a shearable neck 14 connecting said body and head. The head, of course, is hollow, so that the internal threads may be formed by a tool inserted from the head end of the insert. In practice, in order that a flush condition be achieved between the surface 15 of the body 5 and the outer end face 16 of the insert, the length of the body is made to be substantially the same as the depth of the seat into which the same is entered. In other words, when the body end 12 is seated on the conical bottom 6, the faces 15 and 16 will be flush.

It will be noted that the neck is quite thin, defining a narrow annulus strong enough to enable turning of the head 13 to turn the self-tapping body 9 into the soft metal body 5. However, upon said body end seating on bottom 6, and tool-applied rotation of the head continued, the neck 14 will shear off leaving the insert body firmly anchored in the body 5.

In order to reduce the torque needed to cut the threads in the seat of body 5 and, thereby, enable reduction in size of the shearable neck 14, the body 9 embodies a self-tapping means 17 that is here shown, as openings 18 formed in the body, on opposite sides, which may be variously shaped but essentially are defined by angularly directed cutting edges 19 that cut into the cylindrical wall in the hole in body 5 as the insert is being turned by means of its head. Said edges 19 are directed at an angle so that the length thereof is increased, the angle being forward from the bottom up. While two such edges are shown, three may be used, if desired. It is clear that the metal cut by edges 19 is received within the interior of the insert and eventually blown out to clear the internal seat 11 thereof.

If a finishing operation, such as swaging or flattening the annular fracture where the neck 14 has been severed is desired, the same may be carried out in the usual way.

The insert 8 differs from the insert 7 in that the conical end 12 is omitted and the insert is seated upon a countersink 20. To this end, the insert is provided with a conical enlargement 21 that seats on countersink 20 in the same way that closed end 12 seats on the bottom 6. The head 13 is connected by a reduced annular neck 14, as before, but this time, to the outer peripheral edge of the conical enlargement. The internal threads 11 may be blind or, as shown, extend clear through the insert.

The means 17 is provided, as before, to reduce the self-tapping torque, it being clear that the head 13 will shear off at the neck 14 after the enlargement 21 is seated in the counter-sink 20.

The form of FIG. 3 shows the insert according to FIG. 1 with a transverse wall 25 intermediate its ends. This wall is either integral, as shown, or may comprise a separate washer or disc that is pressed into place to separate the internally threaded seat 11 from a bottom-open recess or cavity 26. By placing said wall 25 above the self-tapping means 17, said recess 26 will serve to collect chips 27 formed during the tapping operation, trap the same because of the closed bottom 6, and keep said chips from entering the threaded seat 11. Thus, assurance is had that the threads of seat 11 are clear of metal particles that may prevent proper use thereof. In other respects, the insert is similar to those above described.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claim.

Having thus described this invention, what is claimed and desired to be secured by Letters Patent is:

An insert for insertion into a cylindrical hole having a conical bottoming surface and a hollow internally threaded body, external threads on said body, a lateral opening through said body to provide a self-tapping edge in the body angularly directed across the external threads to minimize the thread-cutting torque, a conical portion on the outside of the body for engaging and bottoming against the bottoming surface, a hollow polygonal head for a tool for turning the insert in a thread-tapping direction, a shearable annular neck, connecting the head and body, said annular neck having the smallest cross-sectional area of the insert and head, and a transverse wall across the interior of the body in spaced relation to the end of said body and closing said hollow body, the mentioned self-tapping edge in the body extending from the lower face of said wall to the body end.

References Cited in the file of this patent

UNITED STATES PATENTS

| | | |
|---|---|---|
| 1,677,269 | Burghart | July 17, 1928 |
| 2,255,997 | Hannenman | Sept. 16, 1941 |
| 2,740,315 | Gouverneur | Apr. 3, 1956 |
| 2,823,574 | Rosan | Feb. 18, 1958 |

FOREIGN PATENTS

| | | |
|---|---|---|
| 1,192,647 | France | Apr. 20, 1959 |